United States Patent [19]

Harris

[11] 3,834,733

[45] Sept. 10, 1974

[54] VELOCIPEDE

[75] Inventor: Trevor L. Harris, Costa Mesa, Calif.

[73] Assignee: Harris Dynamics, Costa Mesa, Calif.

[22] Filed: Dec. 15, 1972

[21] Appl. No.: 315,497

[52] U.S. Cl. .............................. 280/251, 280/255
[51] Int. Cl. ............................................ B62m 1/08
[58] Field of Search ............ 280/251, 253, 255, 258

[56] References Cited
FOREIGN PATENTS OR APPLICATIONS

| | | | |
|---|---|---|---|
| 7,202 | 1898 | Great Britain ...................... | 280/251 |
| 325,140 | 11/1934 | Italy .................................... | 280/253 |
| 20,457 | 1891 | Great Britain ...................... | 280/251 |
| 8,130 | 1899 | Great Britain ...................... | 280/251 |
| 695,307 | 5/1930 | France ................................. | 280/251 |
| 361,504 | 5/1905 | France ................................. | 280/251 |
| 21,570 | 1898 | Great Britain ...................... | 280/251 |
| 16,266 | 1892 | Great Britain ...................... | 280/251 |
| 289,236 | 4/1928 | Great Britain ...................... | 280/251 |

*Primary Examiner*—Robert J. Spar
*Assistant Examiner*—Ross Weaver
*Attorney, Agent, or Firm*—Smyth, Roston & Pavitt

[57] ABSTRACT

A velocipede comprising a frame, a drive wheel rotatably attached to the frame, first and second levers pivotally mounted on the frame for oscillation about first and second axes, respectively, and a power transmission for transmitting power resulting from oscillation of the levers to the drive wheel. The drive ratio between the levers and the drive wheel can be adjusted by the rider while the velocipede is being ridden by moving the location of the attachment of the transmission to the levers longitudinally along the levers.

9 Claims, 5 Drawing Figures

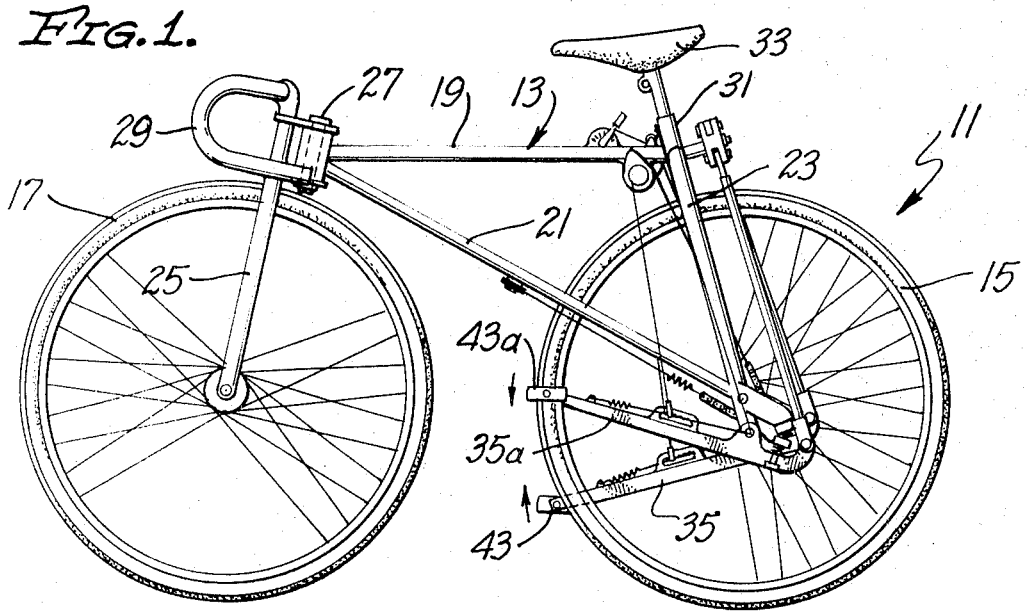
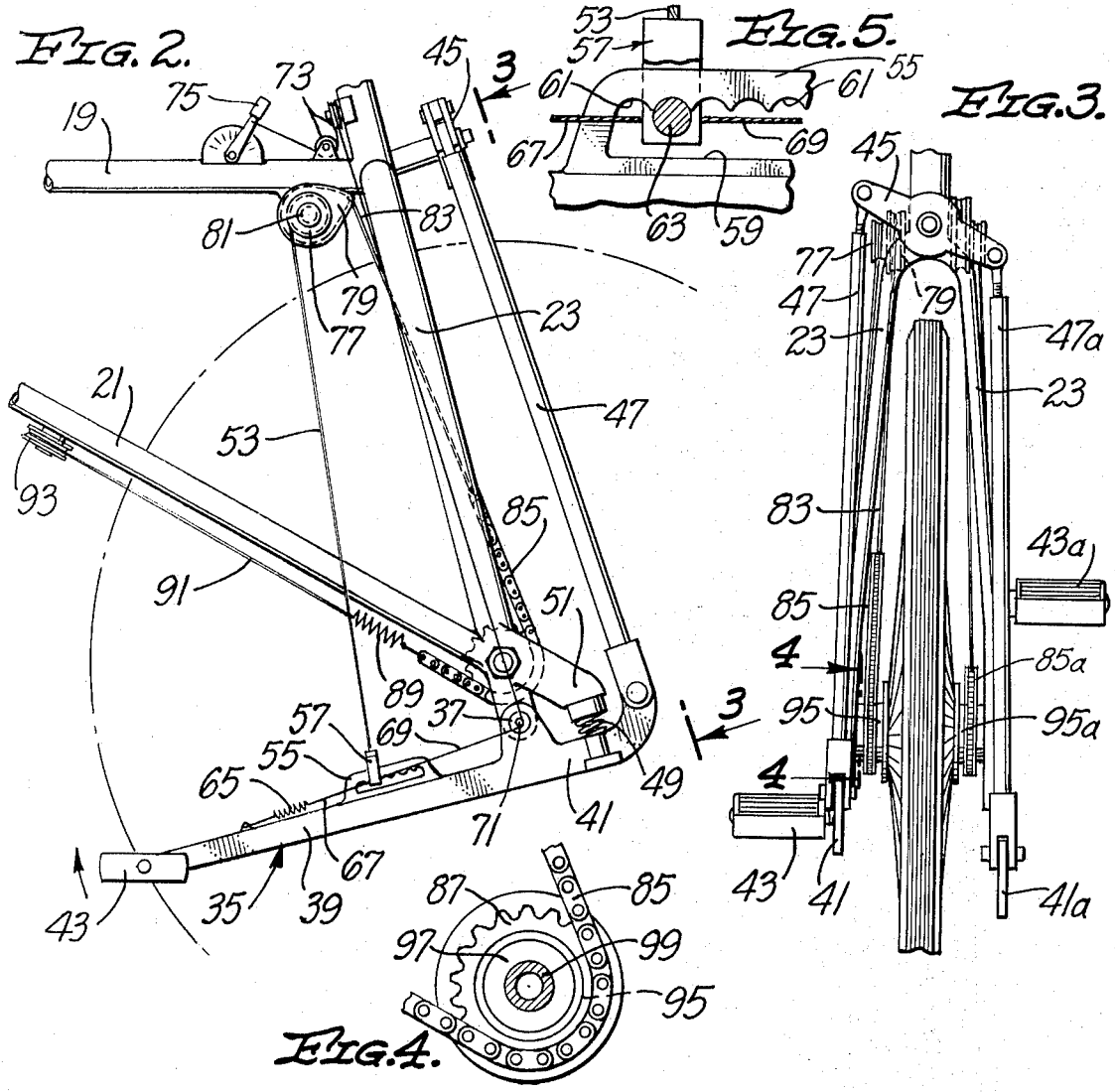

VELOCIPEDE

BACKGROUND OF THE INVENTION

This invention relates to velocipedes, such as bicycles, of the type driven by a pair of oscillatory levers rather than by conventional cranks which are rotated unidirectionally. Typically, the power resulting from oscillation of the levers is transmitted by transmission means to the rear drive wheel of the velocipede to drive the latter. Velocipedes meeting this general description are known and shown by way of example in U.S. Pat. No. 3,039,790.

SUMMARY OF THE INVENTION

With the present invention, a velocipede of this general character is made much easier to ride through the provision of a transmission which permits shifting to provide a variable drive ratio between the levers and the drive wheel. Shifting can be accomplished by the rider of the velocipede as the velocipede is being ridden. Shifting is accomplished by changing the location of the attachment of the transmission to the levers to thereby change the mechanical advantage obtained from the levers.

The present invention advantageously provides first and second relatively movable coupling sections for connecting the transmission to each of the levers. Shifting is accomplished by relatively moving the two coupling sections. For example, this can be accomplished by a flexible element attached to one of the coupling sections and extending to a location to permit the rider to manually exert a force sufficient to adjust the relative positions of the coupling sections.

In one preferred form of the invention, one of the coupling sections has a slot therein and a plurality of notches opening in the slot. The other of the coupling sections is at least partially receivable in the slot and in the notches and this releasably retains the coupling sections in position.

The two levers are preferably positively interconnected so that pivotal movement of either lever in one direction pivots the other of the levers in the opposite direction. This allows each of the levers to do useful work in driving the velocipede on both its upward and downward strokes.

In velocipedes of the kind described, interconnection of the levers in a simple manner is more difficult than might be expected. One reason is that the rear drive wheel of the velocipede lies intermediate the two levers. In addition, the positive interconnection between the levers must be strong to withstand the forces involved, and the frame of the velocipede should not be made more complicated by the interconnection inasmuch as it is normally desirable to simplify the frame and hence reduce the weight of the velocipede.

With the present invention, each of the levers projects forwardly and rearwardly from its pivot axis to define a forward section and a rearward section, respectively. First and second pedals are attached to the forward sections of the first and second levers, respectively. A rocker arm is pivotally mounted on the frame generally above the rear driving wheel. First and second rigid links join the rearward sections of the two levers to the rocker arm on opposite sides of the pivot axis of the rocker arm. This construction positively and simply interconnects the two levers without complicating frame construction and without interference from the rear driving wheel.

To limit the downward stroke of each of the levers, the present invention provides resilient stops engageable with the levers. Resilient stops are better than hard stops because they reduce the abruptness with which the lever terminates the downward stroke and begins the upward stroke. In addition, a resilient stop will return to the lever some of the energy which it absorbs in halting pivotal movement of the lever in one direction.

The present invention also provides means for varying the drive ratio between the levers and the rear drive wheel as a function of the angular position of the levers. This permits the system to be more accurately tailored to typical human ability to drive the levers at various angular positions of the levers. This can advantageously be accomplished by providing a rotatable cam on the frame and flexible means joined to the cam and extending along the periphery thereof for transmitting power from the cam to the rear drive wheel. Means are also provided for converting and transmitting the oscillatory movement of one of the levers into rotational movement of the cam so that the lever can drive the drive wheel. The cam is appropriately constructed and arranged to vary the drive ratio as the lever moves from the upper part of its stroke toward the lower part of its stroke.

It is generally desirable to minimize the weight of a velocipede without reducing its strength and sturdiness. A typical bicycle frame in side elevation includes a pair of triangular sections with one side of the triangles being common. The present invention simplifies this construction substantially by providing a simple frame which is generally triangular in side elevation. The drive wheel is mounted substantially at one corner of the frame and the pivot axes of the levers are adjacent that same corner. A fork is attached to a second corner of the triangular frame and is used to mount a front wheel of the velocipede. A seat for the rider can be advantageously attached to the frame adjacent the third corner of the frame. This construction simplifies frame construction and hence reduces the weight thereof. In addition, by using a triangular frame and locating the pivot axes of the levers adjacent the axis of the rear drive wheel, the frame can be shortened so that the front and rear wheels can be closely adjacent. Shortening of the frame also reduces the weight of the velocipede.

The invention can best be understood by reference to the following description taken in connection with the accompanying illustrative drawing.

BRIEF DESCRIPTION OF THE DRAWING

FIG. 1 is a side elevational view of a bicycle constructed in accordance with the teachings of this invention.

FIG. 2 is an enlarged fragmentary side elevational view of a portion of a bicycle with the rear drive wheel and the far side lever removed.

FIG. 3 is an end elevational view taken generally along line 3—3 of FIG. 2.

FIG. 4 is a sectional view taken generally along line 4—4 of FIG. 3.

FIG. 5 is an enlarged fragmentary view of a portion of the shifting mechanism.

DESCRIPTION OF THE PREFERRED EMBODIMENT

FIG. 1 shows a velocipede in the form of bicycle 11. The concepts of this invention are applicable to velocipedes other than bicycles. The bicycle 11 includes a frame 13, a rear drive wheel 15, and a forward driven wheel 17. The frame 13 is generally triangular in side elevation and includes an upper frame member 19, two diagonal frame members 21, and two rear frame members 23. The frame members 21 and 23 are provided in pairs so that one of each of these frame members can be on each side of the rear wheel 15. The frame members 19, 21 and 23 are rigidly interconnected at their ends and each of the frame members may be in the form of a strong, hollow tube.

The front wheel 17 is rotatably mounted in a conventional manner on a fork 25 which is attached to a forward corner 27 of the frame for pivotal movement. The front wheel 17 can be turned in a conventional manner using the handle bars 29.

A tubular post 31 projects upwardly from a second corner of the frame 13 to mount a seat 33 for the rider. The rear wheel 15 is rotatably mounted at the third corner of the frame.

The bicycle 11 includes a pair of identical levers 35 and 35a for propelling the bicycle. The lever 35 is pivotally mounted on one of the frame members 23 in any suitable manner such as by a pin 37 (FIG. 2). The lever 35a is identical to the lever 35 and is mounted in the same manner for pivotal movement about the same pivot axis. The pin 37 lies closely adjacent and slightly below one corner of the frame 13.

The lever 35 includes a forward section 39 and a rear section 41 with the sections lying on opposite sides of the pivot axis of the lever. The forward sections of the levers 35 and 35a have pedals 43 and 43a, respectively, pivotally mounted thereon.

The levers 35 and 35a are positively interconnected by a linkage which includes a rocker arm 45 pivotally mounted on the frame adjacent one corner thereof and a pair of links 47 and 47a which are pivotally attached to the rear sections 41 and 41a of levers 35 and 35a. Thus, as the lever 35 is pivoted clockwise as viewed in FIG. 2, the lever 35a pivots counterclockwise. Accordingly, the levers 35 and 35a oscillate about their respective pivot axes in an out of phase relationship such that the lever 35a is at the top of its stroke when the lever 35 is at the bottom of its stroke.

To limit the arc of oscillation of the levers 35 and 35a, a resilient stop 49 is carried by the rear section 41 of the lever 35, and is adapted to engage an abutment 51 on the frame 13. The stop 49 cooperates with the abutment 51 to limit the downward stroke of the lever 35 and the upward stroke of the lever 35a. The stop and abutment (not shown) for the lever 35a limit the downward stroke of the lever 35a and the upward stroke of the lever 35.

The lever 35a has an identical stop and abutment. In the embodiment illustrated, the resilient stop 49 includes a spring which is resiliently compressed upon engagement of the stop and the abutment 51; however, the resilient stop could take other forms such as a resilient mass of material such as rubber. Also, the resilient stop could be mounted on the frame rather than on the lever 35.

A transmission is provided for transmitting power resulting from oscillation of the levers 35 and 35a to the drive wheel 15. The transmission includes identical sections for the two levers 35 and 35a. Parts of the transmission section for the lever 35 corresponding to parts of the transmission section for the lever 35 are designated by corresponding reference numerals followed by the letter a.

The transmission section for the lever 35 includes an elongated flexible element in the form of a cable 53 which is attached at one end to the lever 35 by a coupling which includes a fixed coupling section 55 fixedly mounted on the lever 35 and a movable coupling section 57. As best shown in FIG. 5, the coupling section 55 in the embodiment illustrated defines a slot 59 extending longitudinally of the lever 35 and a series of notches 61 opening downwardly in the slot. The movable coupling section 57 in the embodiment illustrated is in the form of a yoke having a transverse pin 63 which is adapted to be received in any one of the notches 61.

The coupling section 57 is biased away from the pivot pin 37 of the lever 35 by a spring 65 which is attached at one end to the lever 35 and at the other end to a flexible element in the form of a cable 67 which in turn is suitably coupled to the movable coupling section 57. The movable coupling section 57 can be selectively restrained from moving to the left as viewed in FIGS. 2 and 5 under the influence of the spring 65 by a flexible element in the form of a cable 69 which is attached to the coupling section 57. The cable 69 extends around a small diameter pully 71 at the pivot axis of the lever 35 and then upwardly around a pair of pulleys 73 to a pivotable shifting lever 75 which can be operated in a conventional manner by the rider of the bicycle 11. The pin 63 is releasably held upwardly in the notches 61 by the cable 53.

By moving the lever 75 so as to provide slack in the cable 69, the spring 65 automatically urges the pin 63 out of one of the notches 61 and to the left to a higher gear as viewed in FIGS. 2 and 5 until such time as the slack in the cable 69 is used up. At this time, the pin 63 enters another one of the notches 61. To move the coupling sections 57 to the right, i.e., to a lower gear, the rider pivots the lever 75 so as to move the coupling section 57 to the right against the biasing force of the spring 65. Of course, other devices may be employed for moving the coupling section 57, if desired.

A pulley 77 and a cam 69 are suitably mounted for rotation on the frame 13 adjacent one corner of the frame 13 by a common shaft 81. The cable 53 is affixed at one end to the pulley 77 so that it can be wound and unwound from the pulley to rotate the latter.

A second cable 83 is attached to the cam 79 at one end and at the other end to a sprocket chain 85. The chain 85 passes around a sprocket wheel 87 and is attached at its other end to a spring 89. The other end of the spring 89 could, if desired, be "ground on," i.e., attached to, the frame member 21. However, in the embodiment illustrated, it is attached to a cable 91 which passes around a pulley 93. The other end of the cable 91 is attached to the spring of the transmission section for the lever 35a which corresponds to the spring 89.

The sprocket 87 is connected to a sheave 95 which is mounted on a one-way clutch 97. The clutch 97 is mounted on a hub 99 which is joined to the wheel 15.

The one-way clutch 97 allows the sprocket 87 to drive the wheel 15 as the sprocket is rotated in one direction and to be free-wheeling with respect to the wheel 15 when the sprocket is driven to the other direction. The chain 85 and the sprocket 87 are moved in a driving direction by depression of the pedal 43 and are mounted in the nondriving direction by the spring 89.

Various forms of one-way clutches can be employed. In the embodiment illustrated, the clutch 97 is of the type which can be selectively manually released to allow the wheel 15 to be free-wheeling in both directions. This would permit the bicycle 11 to be backed up. An identical sprocket, sleeve 95a and one-way clutch are provided for the lever 35a.

In operation of the bicycle 11, the rider oscillates the levers 35 and 35a by sequentially pushing downwardly on the pedals 43 and 43a. If desired, the rider's feet may be attached to the pedals 43 and 43a so that power can be put into the lever system on the upstroke as well as the downstroke. This is made possible by the rocker arm 45 and the links 47 and 47a which positively mechanically interconnect the levers 35 and 35a.

Power is transmitted from the lever 35 on its downstroke to the wheel 15 through the coupling sections 55 and 57, cable 53, pulley 77, shaft 87, cam 79, cable 83, chain 85, sprocket 87, sleeve 95, one-way clutch 97, and hub 99. As the pedal 43 of the lever 35 is driven downwardly, the chain 85 is pulled upwardly to tension the spring 89. Ultimately, the resilient stop 49 contacts the abutment 51 and this progressively halts the downward movement of the pedal 43. Thereafter, the rider depresses the pedal 34a and this drives the pedal 43 upwardly through the link 47a, the rocker arm 45, and the link 47. As the lever 35 is driven upwardly, the spring 89 urges the chain 85 to the left as viewed in FIG. 2 to thereby counter rotate the sprocket 87 and the sleeve 95. However, the one-way clutch 97 allows this counter rotation to occur in a free-wheeling manner so as not to influence the rotation of the drive wheel 15.

The pedal 35a and its transmission section operate in the same manner.

In the embodiment illustrated, the pulley 77 and the cam 79 cooperate to change the drive ratio between the lever 35 and the wheel 15. Specifically, in the embodiment illustrated, the cam 79 is of larger diameter than the pulley 77 so that this has the effect of decreasing power but increasing velocity of the bicycle 11. This function of providing higher gearing could be obtained if the cam 79 were not a cam but simply a larger diameter pulley. However, one important function of the cam is that it provides a drive ratio between the lever 35 and the wheel 15 which varies as a function of the angular position of the lever 35. The contour of the cam 79 can be selected to tailor the variation in drive ratio to the particular results desired. In the embodiment illustrated, the cam 79 is constructed and arranged so that maximum speed is obtained toward the end of the downstroke of the pedal 43 and maximum power is obtained at the beginning of the downstroke of the pedal 43.

Although an exemplary embodiment of the invention has been shown and described, many changes, modifications and substitutions may be made by one having ordinary skill in the art without necessarily departing from the spirit and scope of this invention.

I claim:

1. A wheeled vehicle adapted to be propelled by a rider comprising:
    a frame;
    a front wheel rotatably mounted on said frame;
    a rear wheel rotatably mounted on said frame;
    a first lever mounted on said frame for oscillatory movement about a first pivotal axis;
    a second lever mounted on said frame for oscillatory movement about a second pivotal axis;
    each of said levers having means adapted to cooperate with a foot of the rider to pivot such lever about its pivotal axis;
    transmission means for drivingly coupling said levers to one of said wheels whereby the oscillatory motion of the levers drives said one wheel;
    said transmission means including first means for varying the drive ratio between the levers and said one wheel and control means operable by the rider for controlling said first means whereby the rider can selectively adjust the drive ratio, said control means including elongated flexible means manually operable by the rider for enabling the rider to selectively adjust the drive ratio;
    said transmission means including second means for varying the drive ratio between the first lever and said one wheel as a function of the angular position of said first lever about said first pivotal axis; and
    means for positively drivingly coupling the first and second levers whereby downward pivotal movement of either of said levers results in upward pivotal movement of the other of said levers.

2. A vehicle as defined in claim 1 wherein said second means includes a cam rotatably mounted on said frame, said transmission means includes flexible means coupled to said first lever intermediate the first pivotal axis and the means on the first lever cooperating with the rider's foot.

3. A vehicle as defined in claim 1 wherein said transmission means includes a flexible element and said first means includes first and second coupling sections coupled to the first lever and the flexible element, respectively, said coupling sections having cooperable means thereon for selectively allowing and preventing relative movement therebetween, relative movement of said coupling sections changing the drive ratio.

4. A vehicle as defined in claim 1 wherein said frame is generally triangular in side elevation, said one wheel being attached to said frame substantially at one corner of the frame and the pivotal axes of said levers being adjacent said one corner, and a fork attached to the frame substantially at another corner of said frame for mounting the other of said wheels on said frame.

5. A vehicle as defined in claim 4 wherein said means for coupling includes a rocker arm mounted on said frame for movement about a third pivotal axis, first and second rigid links joining portions of said first and second levers, respectively, to said rocker arm on opposite sides of the pivotal axis of the rocker arm whereby downward pivotal movement of either of said levers results in upward pivotal movement of the other of said levers, said first and second links being on opposite sides of the bicycle.

6. A bicycle adapted to be propelled by a rider comprising:
    a frame, said frame being generally triangular in side elevation and having first and second corners;

a fork rotatably mounted on said frame adjacent said first corner;
a front wheel rotatably mounted on said fork;
a rear wheel rotatably mounted on said frame adjacent said second corner;
a first lever mounted on said frame adjacent said second corner for oscillatory movement about a first pivotal axis;
a second lever mounted on said frame adjacent said second corner for oscillatory movement about a second pivotal axis;
each of said levers having means adapted to cooperate with a foot of the rider to pivot such lever about its pivotal axis;
transmission means for drivingly coupling said levers to said rear wheel whereby the oscillatory motion of the levers drives said rear wheel;
said transmission means including first means for varying the drive ratio between the first lever and said rear wheel as a function of the angular position of said first lever about said first pivotal axis, second means for varying the drive ratio between the second lever and said rear wheel as a function of the angular position of said second lever about said second pivotal axis, and third means manually operable by the rider for selectively changing the drive ratio; and
a linkage for positively drivingly coupling the first and second levers whereby downward pivotal movement of either of said levers results in upward pivotal movement of the other of said levers.

7. A wheeled vehicle adapted to be propelled by a rider comprising:
a frame;
a front wheel rotatably mounted on said frame;
a rear wheel rotatably mounted on said frame;
a first lever mounted on said frame for oscillatory movement about a first pivotal axis;
a second lever mounted on said frame for oscillatory movement about a second pivotal axis;
each of said levers having means adapted to cooperate with a foot of the rider to pivot such lever about its pivotal axis;
transmission means for drivingly coupling said levers to one of said wheels whereby the oscillatory motion of the levers drives said one wheel;
said transmission means including first means for varying the drive ratio between the levers and said one wheel and control means operable by the rider for controlling said first means whereby the rider can selectively adjust the drive ratio;
said transmission means including second means for varying the drive ratio between the first lever and said one wheel as a function of the angular position of said first lever about said first pivotal axis;
said frame being generally triangular in side elevation, said one wheel being attached to said frame substantially at one corner of the frame and the pivotal axes of said levers being adjacent said one corner;
a fork attached to the frame substantially at another corner of said frame for mounting the other of said wheels on said frame;
a rocker arm mounted on said frame for movement about a third pivotal axis, first and second rigid links joining portions of said first and second levers, respectively, to said rocker arm on opposite sides of the pivotal axis of the rocker arm whereby downward pivotal movement of either of said levers results in upward pivotal movement of the other of said levers, said first and second links being on opposite sides of the bicycle;
said second means including a cam rotatably mounted on said frame; and
said transmission means including flexible means coupled to said first lever intermediate the first pivotal axis and the means on the first lever for cooperating with the rider's foot, said control means including a cable operated by the rider for varying the location along said first lever at which the flexible means is coupled to the first lever to thereby vary the drive ratio.

8. A vehicle as defined in claim 7 including a resilient stop for limiting the oscillatory motion of at least one of said levers in at least one direction.

9. A wheeled vehicle adapted to be propelled by a rider comprising:
a frame;
a front wheel rotatably mounted on said frame;
a rear wheel rotatably mounted on said frame;
a first lever mounted on said frame for oscillatory movement about a first pivotal axis;
a second lever mounted on said frame for oscillatory movement about a second pivotal axis;
each of said levers having means adapted to cooperate with a foot of the rider to pivot such lever about its pivotal axis;
transmission means for drivingly coupling said levers to one of said wheels whereby the oscillatory motion of the levers drives said one wheel;
said transmission means including first means for varying the drive ratio between the levers and said one wheel and control means operable by the rider for controlling said first means whereby the rider can selectively adjust the drive ratio;
said transmission means including second means for varying the drive ratio between the first lever and said one wheel as a function of the angular position of said first lever about said first pivotal axis;
said second means including a cam rotatably mounted on said frame;
said transmission means including flexible means coupled to said first lever intermediate the first pivotal axis and the means on the first lever cooperating with the rider's foot, and said control means including cable means manually operable by the rider for enabling the rider to selectively adjust the drive ratio; and
a linkage for positively drivingly coupling the first and second levers whereby downward pivotal movement of either of said levers results in upward pivotal movement of the other of said levers.

* * * * *